United States Patent
Anantharaman

(10) Patent No.: US 10,460,082 B2
(45) Date of Patent: *Oct. 29, 2019

(54) DIGITAL RIGHTS MANAGEMENT PROGRESSIVE CONTROL AND BACKGROUND PROCESSING

(71) Applicant: Adobe Inc., San Jose, CA (US)

(72) Inventor: Arun Anantharaman, Lost Altos Hills, CA (US)

(73) Assignee: Adobe Inc., San Jose, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/090,211

(22) Filed: Apr. 4, 2016

(65) Prior Publication Data

US 2017/0286642 A1    Oct. 5, 2017

(51) Int. Cl.
| | |
|---|---|
| G06F 21/10 | (2013.01) |
| G06Q 50/00 | (2012.01) |
| H04L 12/26 | (2006.01) |
| G06F 21/31 | (2013.01) |
| G06F 21/32 | (2013.01) |

(52) U.S. Cl.
CPC ............ G06F 21/10 (2013.01); G06F 21/316 (2013.01); G06Q 50/01 (2013.01); H04L 43/028 (2013.01); G06F 21/32 (2013.01); G06F 2221/2139 (2013.01)

(58) Field of Classification Search
CPC ................................ G06F 21/10; H04L 63/10
See application file for complete search history.

(56) References Cited

U.S. PATENT DOCUMENTS

| | | |
|---|---|---|
| 6,317,795 B1 | 11/2001 | Malkin et al. |
| 6,978,376 B2 | 12/2005 | Giroux et al. |
| 7,013,149 B2 | 3/2006 | Vetro et al. |
| 8,316,020 B1 | 11/2012 | Kleinmann |

(Continued)

OTHER PUBLICATIONS

Chun-Te Chen et al., "An Approach of Digital Rights Management for E-Museum with Enforce Context Constraints in RBAC Environments" Oct. 8-11, 2006; 2006 IEEE International Conference on Systems, Man, and Cybernetics; Taipei, Taiwan; Print ISSN: 1062-922X, pp. 1871-1878.*

(Continued)

Primary Examiner — Harunur Rashid
(74) Attorney, Agent, or Firm — SBMC

(57) ABSTRACT

Digital rights management progressive control and background processing techniques are described. In one or more implementations, a digital rights management module is embedded as part of the content. In one example, the digital rights management module is configured to monitor user interaction with items of the content and user traits collected from this monitoring to progressively control access to other items of the digital content. In another example, the digital rights management module is configured for execution in the background of a computing device, e.g., without rendering of a user interface or accepting user inputs. This background processing is used to monitor interaction of the user with the computing device that is independent of the content. This includes other content, applications, interaction with service providers (e.g., websites such as a social network), wearable devices, the computing device itself, and so forth.

20 Claims, 8 Drawing Sheets

(56) References Cited

U.S. PATENT DOCUMENTS

| | | |
|---|---|---|
| 8,838,646 B2 | 9/2014 | Kuehr-McLaren et al. |
| 9,613,190 B2 | 4/2017 | Ford et al. |
| 9,928,374 B2 | 3/2018 | Anantharaman |
| 9,953,142 B2 | 4/2018 | Anantharaman |
| 10,248,802 B2 | 4/2019 | Anantharaman |
| 10,346,594 B2 | 7/2019 | Anantharaman |
| 2002/0002563 A1 | 1/2002 | Bendik |
| 2002/0077985 A1 | 6/2002 | Kobata et al. |
| 2002/0077986 A1 | 6/2002 | Kobata et al. |
| 2003/0052911 A1* | 3/2003 | Cohen-Solal ..... H04L 29/06027 715/738 |
| 2004/0044779 A1* | 3/2004 | Lambert ................ G06F 21/10 709/229 |
| 2004/0148424 A1 | 7/2004 | Berkson |
| 2005/0044016 A1 | 2/2005 | Irwin et al. |
| 2005/0066357 A1 | 3/2005 | Ryal |
| 2005/0125673 A1* | 6/2005 | Cheng ................... G06F 21/32 713/182 |
| 2005/0273514 A1 | 12/2005 | Milkey et al. |
| 2006/0041502 A1 | 2/2006 | Blair et al. |
| 2006/0149727 A1* | 7/2006 | Viitaharju ............... G06F 21/10 |
| 2007/0156659 A1 | 7/2007 | Lim |
| 2007/0180519 A1 | 8/2007 | Boccon-Gibod et al. |
| 2007/0204078 A1 | 8/2007 | Boccon-Gibod et al. |
| 2008/0005235 A1 | 1/2008 | Hegde et al. |
| 2008/0059474 A1 | 3/2008 | Lim |
| 2008/0060084 A1 | 3/2008 | Gappa et al. |
| 2008/0104118 A1 | 5/2008 | Pulfer et al. |
| 2008/0167921 A1 | 7/2008 | Seo et al. |
| 2008/0182592 A1 | 7/2008 | Cha et al. |
| 2008/0320000 A1 | 12/2008 | Gaddam |
| 2009/0007227 A1 | 1/2009 | Burgess et al. |
| 2009/0048908 A1* | 2/2009 | Kaplan .................. G06Q 30/02 705/7.33 |
| 2009/0228486 A1 | 9/2009 | Kuehr-McLaren et al. |
| 2009/0300712 A1* | 12/2009 | Kaufmann .............. G06F 21/10 726/1 |
| 2010/0005518 A1 | 1/2010 | Tirpak et al. |
| 2010/0185502 A1 | 7/2010 | Roberts et al. |
| 2010/0293049 A1 | 11/2010 | Maher et al. |
| 2010/0293058 A1 | 11/2010 | Maher et al. |
| 2011/0235799 A1 | 9/2011 | Sovio et al. |
| 2011/0258049 A1 | 10/2011 | Ramer et al. |
| 2012/0066269 A1 | 3/2012 | Kim |
| 2012/0216300 A1 | 8/2012 | Vivolo et al. |
| 2012/0303827 A1 | 11/2012 | Neystadt et al. |
| 2013/0052990 A1 | 2/2013 | Zhang |
| 2013/0254699 A1 | 9/2013 | Bashir et al. |
| 2013/0315392 A1 | 11/2013 | Steinhauser |
| 2013/0332987 A1 | 12/2013 | Tenneti et al. |
| 2014/0040371 A1 | 2/2014 | Gurevich et al. |
| 2014/0181993 A1* | 6/2014 | Jogand-Coulomb ... G06F 21/10 726/27 |
| 2014/0201351 A1 | 7/2014 | Fransen |
| 2014/0278821 A1 | 9/2014 | McConnell |
| 2014/0298207 A1 | 10/2014 | Ittah et al. |
| 2014/0304836 A1 | 10/2014 | Velamoor et al. |
| 2014/0338001 A1 | 11/2014 | Zhang et al. |
| 2015/0120648 A1 | 4/2015 | Slovacek |
| 2015/0234796 A1* | 8/2015 | Williams ............ G06F 17/2247 715/229 |
| 2015/0281299 A1* | 10/2015 | Moustafa ................ H04L 65/60 709/219 |
| 2015/0310188 A1 | 10/2015 | Ford et al. |
| 2015/0324698 A1* | 11/2015 | Karaoguz ........... G06F 19/3437 706/46 |
| 2016/0021503 A1 | 1/2016 | Tapia |
| 2016/0189198 A1 | 6/2016 | McKenzie et al. |
| 2017/0032109 A1 | 2/2017 | Anantharaman |
| 2017/0041296 A1 | 2/2017 | Ford et al. |
| 2017/0142076 A1 | 5/2017 | Ford et al. |
| 2017/0163839 A1* | 6/2017 | Arana ................. H04N 1/3232 |
| 2017/0177886 A1 | 6/2017 | Anantharaman |
| 2017/0249663 A1 | 8/2017 | Hajiyev et al. |
| 2017/0262619 A1 | 9/2017 | Taneja et al. |
| 2017/0277868 A1 | 9/2017 | Anantharaman |
| 2017/0278205 A1 | 9/2017 | Anantharaman |
| 2017/0278206 A1 | 9/2017 | Anantharaman |
| 2018/0060598 A1 | 3/2018 | Anantharaman |
| 2018/0137121 A1 | 5/2018 | Agarwal |

OTHER PUBLICATIONS

Christian et al, "Context-aware Policy Enforcement for Android", Published in: 2013 IEEE 7th International Conference on Software Security and Reliability, Aug. 1, 2013, pp. 40-49.*

Carreras et al., "A Platform for Context-Aware and Digital Rights Management Enabled Content Adaptation" Published by the IEEE Computer Socity, IEEE MultiMedia ( vol. 17, Issue: 2, Apr.-Jun. 2010) pp. 74-89.*

"Pre-Interview Communication", U.S. Appl. No. 14/812,825, dated Oct. 21, 2016, 3 pages.

"Pre-Interview Communication", U.S. Appl. No. 14/975,442, dated Aug. 4, 2017, 3 pages.

Surminen, "Location-based DRM using WiFi Access Points", 2007 International Symposium on Communications and Information Technologies (ISCIT 2007), 2007, 5 pages.

"First Action Interview Office Action", U.S. Appl. No. 14/812,825, dated Mar. 24, 2017, 3 pages.

"Final Office Action", U.S. Appl. No. 14/812,825, dated Sep. 7, 2017, 9 pages.

"First Action Interview Pre-Interview Communication", U.S. Appl. No. 15/063,996, dated Oct. 16, 2017, 3 pages.

"Non-Final Office Action", U.S. Appl. No. 15/080,062, dated Nov. 3, 2017, 16 pages.

"Notice of Allowance", U.S. Appl. No. 14/975,442, dated Nov. 2, 2017, 8 pages.

"Corrected Notice of Allowance", U.S. Appl. No. 14/975,442, dated Nov. 29, 2017, 4 pages.

"Notice of Allowance", U.S. Appl. No. 14/812,825, dated Dec. 18, 2017, 7 pages.

"Corrected Notice of Allowance", U.S. Appl. No. 14/975,442, dated Feb. 27, 2018, 5 pages.

"Final Office Action", U.S. Appl. No. 15/063,996, dated Mar. 26, 2018, 13 pages.

"Final Office Action", U.S. Appl. No. 15/080,062, dated May 10, 2018, 17 pages.

"Final Office Action", U.S. Appl. No. 15/803,452, dated Sep. 7, 2018, 11 pages.

"First Action Interview Office Action", U.S. Appl. No. 15/803,452, dated Jul. 11, 2018, 3 pages.

"Non-Final Office Action", U.S. Appl. No. 15/063,996, dated Jul. 10, 2018, 13 pages.

"Non-Final Office Action", U.S. Appl. No. 15/080,062, dated Jul. 13, 2018, 16 pages.

"Pre-Interview First Office Action", U.S. Appl. No. 15/079,788, dated Aug. 8, 2018, 26 pages.

"Pre-Interview First Office Action", U.S. Appl. No. 15/080,181, dated Jul. 27, 2018, 3 pages.

"Pre-Interview First Office Action", U.S. Appl. No. 15/803,452, dated Jun. 8, 2018, 4 pages.

Muhlbauer,"Location Constraints in Digital Rights Management", Jun. 8, 2018, 8 pages.

"Advisory Action", U.S. Appl. No. 15/803,452, dated Nov. 23, 2018, 3 pages.

"Final Office Action", U.S. Appl. No. 15/063,996, dated Jan. 23, 2019, 19 pages.

"Final Office Action", U.S. Appl. No. 15/079,788, dated Jan. 31, 2019, 10 pages.

"Final Office Action", U.S. Appl. No. 15/080,062, dated Nov. 9, 2018, 21 pages.

"Notice of Allowance", U.S. Appl. No. 15/803,452, dated Dec. 11, 2018, 8 pages.

"Non-Final Office Action", U.S. Appl. No. 15/080,181, dated Mar. 28, 2019, 14 pages.

(56) References Cited

OTHER PUBLICATIONS

"Notice of Allowance", U.S. Appl. No. 15/080,062, dated Feb. 20, 2019, 14 pages.
"Supplemental Notice of Allowability", U.S. Appl. No. 15/803,452, dated Feb. 27, 2019, 2 pages.
"Final Office Action", U.S. Appl. No. 15/079,788, dated Jul. 18, 2019, 11 pages.
"Final Office Action", U.S. Appl. No. 15/080,181, dated Jul. 22, 2019, 17 pages.
"Non-Final Office Action", U.S. Appl. No. 15/063,996, Jul. 25, 2019, 11 pages.

* cited by examiner

702
Monitor interaction of a user with the computing device through background execution of the embedded digital rights management module, the interaction performed independent of the content

704
Form a model from traits observed during the interaction through use of the digital rights management module

706
Control access to the at least one item of content through use of a digital rights management module embedded as part of the content, the controlling based on whether the traits of the model of the user meet specified traits of a behavior of a digital rights management policy enforced by the digital rights management module for the content

*Fig. 7*

DIGITAL RIGHTS MANAGEMENT PROGRESSIVE CONTROL AND BACKGROUND PROCESSING

BACKGROUND

Digital rights management is used to control use of content, e.g., to alter, consume, or distribute content. Current digital rights management techniques are based on qualities that are unique to a particular user. For example, a purchaser of an application from a conventional application store, a song from an online music store, and so on may be given access to the content via a user name and password of an account associated with the user for a corresponding service. Other conventional examples include persistent online authentication, unique content identifiers (e.g., CD keys), digital watermarks, and encryption keys associated with a particular user or user's device.

Each of these conventional techniques, however, is rigid and lacks an ability to address changes in how the content is to be consumed and thus limit usability of the content. Accordingly, this "all-or-nothing" approach to content access may be frustrating to consumers of the content and thus limit desired distribution of the content, and even force the creation of multiple versions of the content and consequently complicate distribution of this content to intended recipients. Further, these conventional techniques are also rigid due to an inability to address changes of traits and behaviors learned through continued interaction with the content or other content, functionality, or services that are accessible via the computing device.

SUMMARY

Digital rights management progressive control and background processing techniques are described. A digital rights management module is embedded as part of the content. In one example, the digital rights management module is configured to monitor user interaction with items of the content and use traits collected from this monitoring to progressively control access to other items of the content. In another example, the digital rights management module is configured for execution in the background of a computing device, e.g., without rendering of a user interface or accepting user inputs. This background processing is used to monitor interaction of the user with the computing device that is independent of the content. This includes other content, applications, interaction with service providers (e.g., websites such as a social network), wearable devices, the computing device itself, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 7 is a flow diagram depicting a procedure in an example implementation in which progressive control of access to content is based on a model of traits observed during interaction independent of the content.

DETAILED DESCRIPTION

Overview

Figure 1:
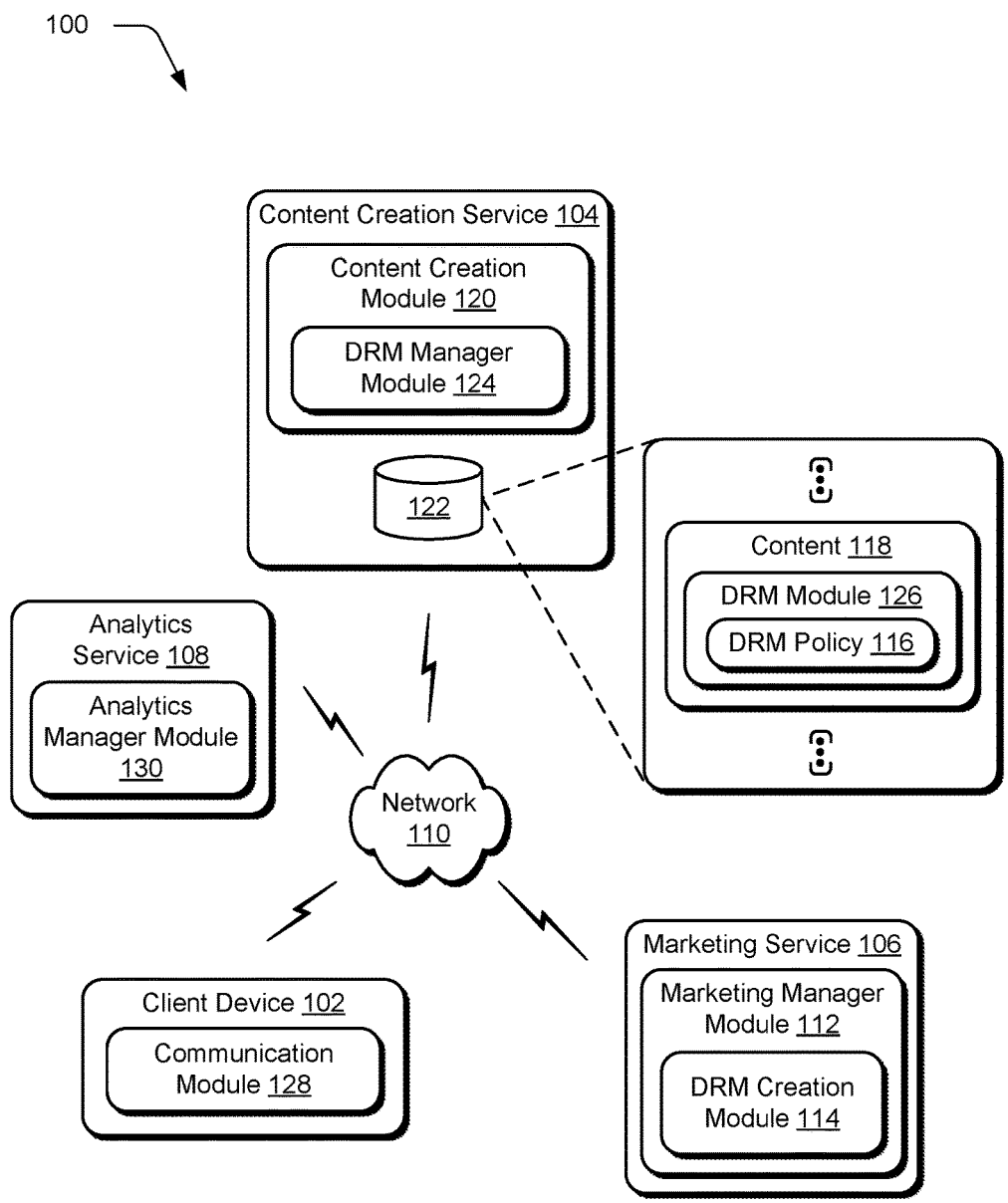
FIG. 1 is an illustration of an environment in an example implementation that is operable to employ digital rights management (DRM) and behavioral trait techniques described herein.

Conventional digital rights management techniques are rigid and inflexible and thus not able to take into account potentially changing traits of a behavior of a user that is to consume content. For example, conventional techniques typically rely on credentials that are particular to a user such that the credentials uniquely identify that user from each other user. Verification of these credentials is then used to grant access to the content in its entirety in these conventional techniques. This is because conventional credentials do not describe content consumption characteristics of the user.

A user name and password, for instance, may be used to control access to content obtained from an online music store, application store, and so on. Accordingly, the user name and password do not describe behaviors of a population, such as a way in which the population acts or conducts itself toward content. As such, although these conventional techniques may relate to the particular user, these techniques do not address traits of a population behavior that may include the user and thus are not capable of addressing changing traits of the behaviors of the users nor can these conventional techniques adapt to other users.

Digital rights management techniques are described that address traits of a behavior of a user population that is to consume the content. In one or more implementations, traits of a behavior are specified that are incorporated as part of a digital rights management policy for content. Analytics data, for instance, may be collected that describes a user population as a whole. A creator of a DRM policy may then select traits of behaviors for a target population as a subset of this user population to control content consumption by the subset of the user population. As described above, behaviors describe a way in which a user population acts or conducts itself toward content that is relevant to the population as a whole but is not particular to any specific user of that population.

In this way, access to all or portions (i.e., items) of the content may be controlled by a digital rights management module based on contemplated behaviors of consumers of the content, which is embedded as part of the content. For example, a marketer may wish to include an image as part of a marketing campaign for a population segment. The marketer may then specify traits of behaviors of the specific target population (e.g., content consumption characteristics related to age, gender, geographic location included as part of analytics data) to be implemented as part of a digital rights management policy as well as characteristics of content that is to be created.

The characteristics of the content as specified by the marketer are then used by a creative professional to create the content, which is then embedded with a digital rights management module that is configured to implement the digital rights management policy. Thus, in this example a workflow may be supported in which a target population and corresponding policy is first specified through interaction with analytics data and then used as a basis to create content for deployment.

Once deployed, the digital rights management (DRM) module may implement the digital rights management policy to dynamically address traits and changes to the traits of a behavior of users that consume the content. The DRM module, for instance, is configured to progressively control access to different portions of the content based on which traits are met by a user requesting this access. For example, the DRM module may be configured to monitor user interaction with the content as well as other content, the computing device itself, other devices (e.g., wearable devices) and so on. A model of the user is then updated as this monitoring progresses to "learn" more about the user. This model is then used to control access to items of the digital content, such as determine "what the user should view next." Accordingly, a single item of content may dynamically change to address changing behaviors of users that are to consume the content which was not possible in conventional techniques, which thus required updates and changes to the content which would then be populated back to the users.

In the description herein, content refers to a variety of different types of content, such as images, video, sound, and so on. Accordingly, characteristics of content to be created may describe a variety of visual and/or audio characteristics, such as objects to be included in an image, general look and feel of the image, types of sounds to be included in sound, locations for capture of video, and so forth. Digital rights management refers to access control techniques that are usable to control access to the content as a whole or particular portions of the content through use of a digital rights management policy, which in the following may be based on traits of a behavior. Traits of behaviors describe a way in which a user population acts or conducts itself toward content that is relevant to the population as a whole but is not particular to any specific user of that population, such as age group, gender, geographic location, profile, business status, group membership, device characteristics, motion or environmental traits, and so forth. Thus, traits met by a particular user are leveraged by the digital rights management policy to control access to content as a whole or particular portions of the content as further described below.

An example environment is first described that may employ the DRM techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital rights management and behavioral trait techniques described herein. The illustrated environment 100 includes a client device 102, a content creation service 104, a marketing service 106, and an analytics service 108 that are communicatively coupled, one to another, via a network 110. Each of these entities may be configured in a variety of ways using one or more computing devices.

A computing device, for instance, may be configured as a desktop computer, a laptop computer, a mobile device (e.g., assuming a handheld configuration such as a tablet or mobile phone as illustrated), and so forth to implement the client device 102. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" to implement the content creation service 104, the marketing service 106, and the analytics service 108 as further described in relation to FIG. 8.

The marketing service 106 is illustrated as including a marketing manager module 112. The marketing manager module 112 is representative of functionality to support user interaction to create a marketing campaign, track deployment of the marketing campaign, and so forth. A user, for instance, may interact with the marketing manager module 112 to specify a marketing campaign, items of content to be included in the campaign, and one or more behaviors of the campaign. The user may also interact with a DRM creation module 114 that is representative of functionality to specify traits of behaviors to form a DRM policy 116 to be utilized to manage access to content 118. The campaign, for instance, may be configured to control output of different images as a background based on age of users that access the content.

The marketing manager module 112 may employ analytics to generate analytics data (i.e., "big data") that describes a user population, such as traits of behaviors as described above. Through interaction with the marketing manager module 112, a user may then select traits of behaviors of a target population from this data that are to be met by users to consume corresponding portions of content 118. For example, the marketing manager module 112 may output a user interface via which a user may select traits of behaviors for a desired target population (e.g., age, gender, job title), such as by selecting a check box, keyword input, and so forth. In this way, the user is provided with detailed knowledge of traits of behaviors of a target population and from this knowledge selects traits of behaviors to be met to consume particular portions of the content 118, rather than guessing which traits could be met by a target population as performed in conventional techniques which may be prone to error and inefficient.

Data describing the content 118 to be created and the traits specified above as part of creation of the DRM policy 116 through interaction with the DRM creation module 114 is then provided to a content creation service 104 in this example. The content creation service 104 includes a content creation module 120 that is representative of functionality to create content 118, which is illustrated as stored in storage 122. A variety of content 118 may be created, such as webpages, advertisements, media including video and/or audio content, and so forth.

Continuing with the previous example, a user interacts with the content creation module 120 to create content 118 having characteristics as specified by the marketing service 106. As part of this creation, a DRM manager module 124 is used to embed a DRM module 126 as part of the content 118. The DRM manager module 124 is representative of functionality to control implementation of the DRM policy 116 as part of the content 118 during consumption of the content 118, e.g., by a communication module 128 (e.g., browser, web-enabled application) of the client device 102.

The DRM module 126 is configured to determine traits of a user that requests access to the content 118 and provide access to portions of the content 118, if any, that correspond to those traits. For example, the DRM policy 116 may specify different backgrounds of an advertisement for different behaviors. Accordingly, the DRM module 126 determines traits of a user's request for access and provides access to corresponding portions of the content 118, e.g., the backgrounds. In this way, the DRM policy 116 as specified by the marketing service 106 serves as a basis for creation of the content 118 and management of access to portions of the content 118. Examples that support additional complications and dynamic responses of DRM control are described in the following.

The DRM module 126 is configured to leverage data obtained from a variety of sources to determine traits associated with a user in order to control access. This includes sources that are available via the network (e.g., a social network service0, the client device 102 itself, a wearable or other peripheral device communicatively coupled to the client device 102, and so forth. An example of one such source is illustrated as an analytics service 108 having an analytics manager module 130 that is representative of functionality to collect analytics data. This may include analytics data such as social network posts, webpages visited, items bought and so forth that is exposed via application programming interfaces by websites. This may also include tracking code that is embedded as part of content that exposes data describing usage of the content. Thus, the "big data" collected by the analytics service 108 from third-party sources may describe the user and content usage of the user which may then be used by the DRM module 126 to control interaction with the content 118 as further described below.

Figure 2:
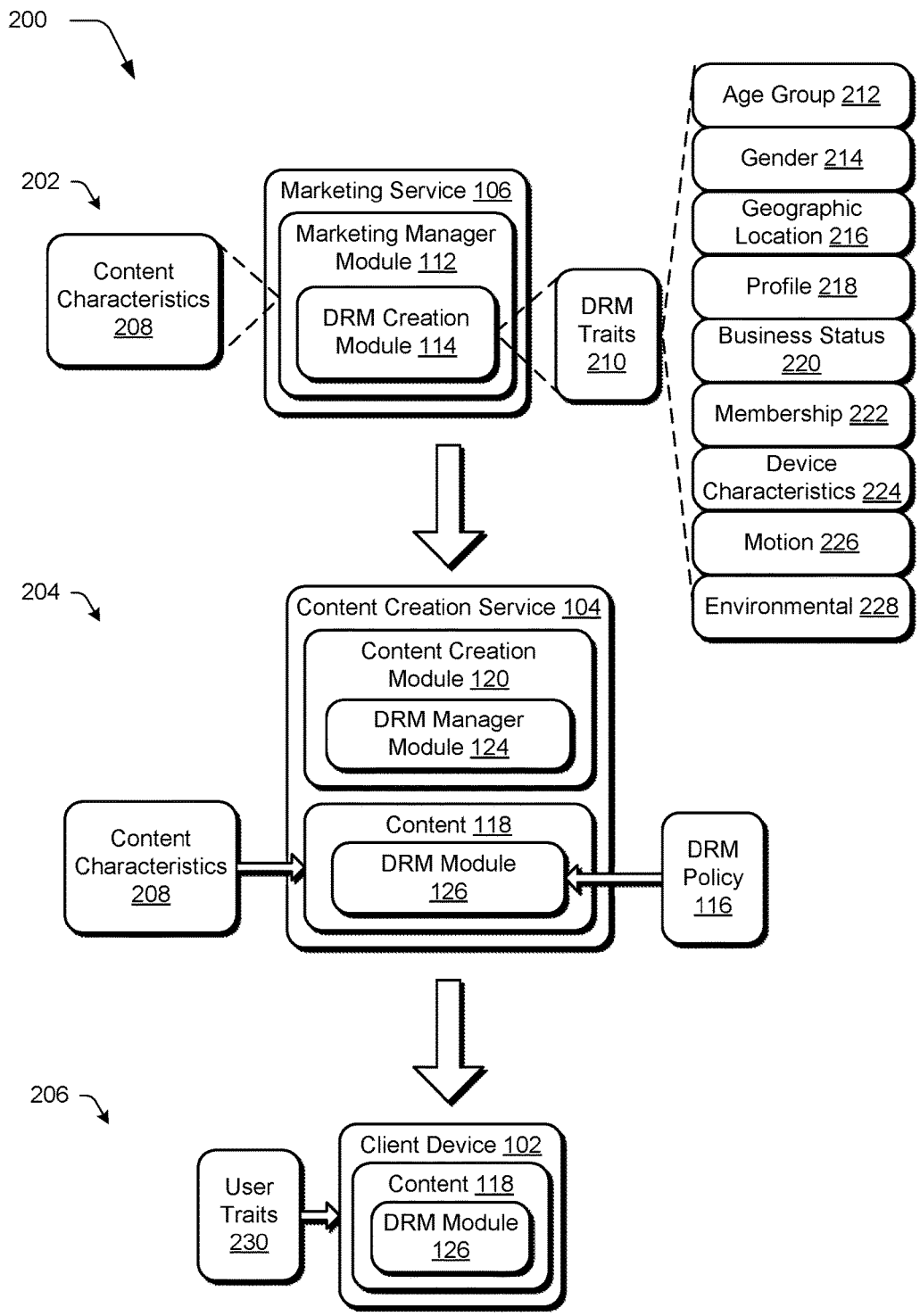
FIG. 2 depicts a system in an example implementation of creation of a DRM policy and subsequent content to be consumed by users included in a behavior.

FIG. 2 depicts a system 200 in an example implementation of creation of a DRM policy and subsequent content to be consumed by users included in a target segment. The system 200 is illustrated using first, second, and third stages 202, 204, 206. At the first stage 202, user interaction with a marketing manager module 110 is used to specify content characteristics 208, e.g., for part of a marketing campaign. A variety of different content characteristics 208 may be specified, including type of content such as webpage, printed add, audio such as a jingle or song, video such as an instructional product video or dedicated product advertisement, legal contract. The content is also deliverable in a variety of ways, e.g., streaming or downloaded for local storage and subsequent playback.

The marketing manager module 112 as previously described also includes a DRM creation module 114. The DRM creation module 114 in this instance is representative of functionality to specify digital rights management (DRM) traits 210 of behaviors that are used to create a DRM policy 116 of the content creation service 104. The DRM policy 116 as previously described is configured to control content access by determining which traits of users are satisfied in order to gain access to portions of content. As described above, the DRM traits may be specified in a variety of ways, such as through selection of particular traits collected through analytics by the marketing service 106.

A variety of different DRM traits 210 may be specified, such as traits particular to a behavior but are not unique to individual members having the behavior, e.g., may be satisfied by a plurality of users. Examples of such behavioral traits that are usable to determine potential interaction of a user with content include age group 212 (e.g., particular age or age range), gender 214, geographic location 216 (e.g., based on IP address, city, state, region, country, continent), organizational associations such as profile 218 (e.g., traits included in a social network profile, business title in a business website, educational degrees achieved, particular skills), business status 220 (e.g., whether an associated business is in good standing, business certifications), group membership 222 (e.g., membership to a particular organization), and other traits such as device characteristics 224 of a device being used by the user to gain access (e.g., brand, hardware resources, software resources, display resources), and temporal traits (e.g., business hours, time of day, day of week, week of month, year). Additional examples of traits include motion 226 (e.g., motion exhibited by a user or a device making a request), environmental 228 (e.g., a user's surrounding or biometric to describe the user), and so forth.

At the second stage 204, a content creation module 120 of the content creation service 104 is used to create content 118 and a DRM module 126 to control access to the content 118 as specified by a DRM policy 116 created based on the specified DRM traits 210. A creative professional, for instance, may interact with the content creation module 120 of the content creation service 104 to create content 118 as specified by the content characteristics 208 received from the marketing service 106. The marketing service 106, for instance, may specify different images and the content characteristics 208 thereof to be used as alternatives as part of a marketing campaign based on the DRM traits 210. The creative professional may then create content 118 as specified.

The content creation module 116 also includes a DRM manger module 124 that is representative of functionality that is configured to implement the DRM policy 116 through embedding the DRM module 126 as part of the content 118. The DRM module 126, for instance, may be executable to determine DRM traits associated with consumption of the content 118. As described above, these may include DRM traits 210 of a behavior that are not specific to a particular user, including traits of a device used, age group, geographic location, and so forth.

Accordingly, the content 118 having the DRM module 126 may be provided to a client device 102 for consumption as shown at the third stage 206. The DRM module 126 may then be utilized to address differences in traits between users, such as gender 212. The DRM module 126 is also usable to address changes in the user, itself, such as change in age group 212, geographic location 216, business status 220 (e.g., job title), membership 222, motion 226, an environment 228 in which the user is location, and so on and may continue to address these changes as they happen. Further, as the DRM module 126 is embedded as part of the content 118 this dynamic consumption may be performed offline without accessing a network, and thus may address limitations of conventional techniques that required access in order to serve different content, such as targeted advertisements as part of webpages that are obtained and not available locally until relevant characteristics of a user are determined. In another example, the DRM module 126 is executed in the background to monitor interaction with other content, devices, and so on as further described in relation to FIGS. 5 and 7. In this way, the DRM module 126 may compare user traits 230 to the DRM traits 210 to determine which traits are met and control access to corresponding items of content.

Figure 3:
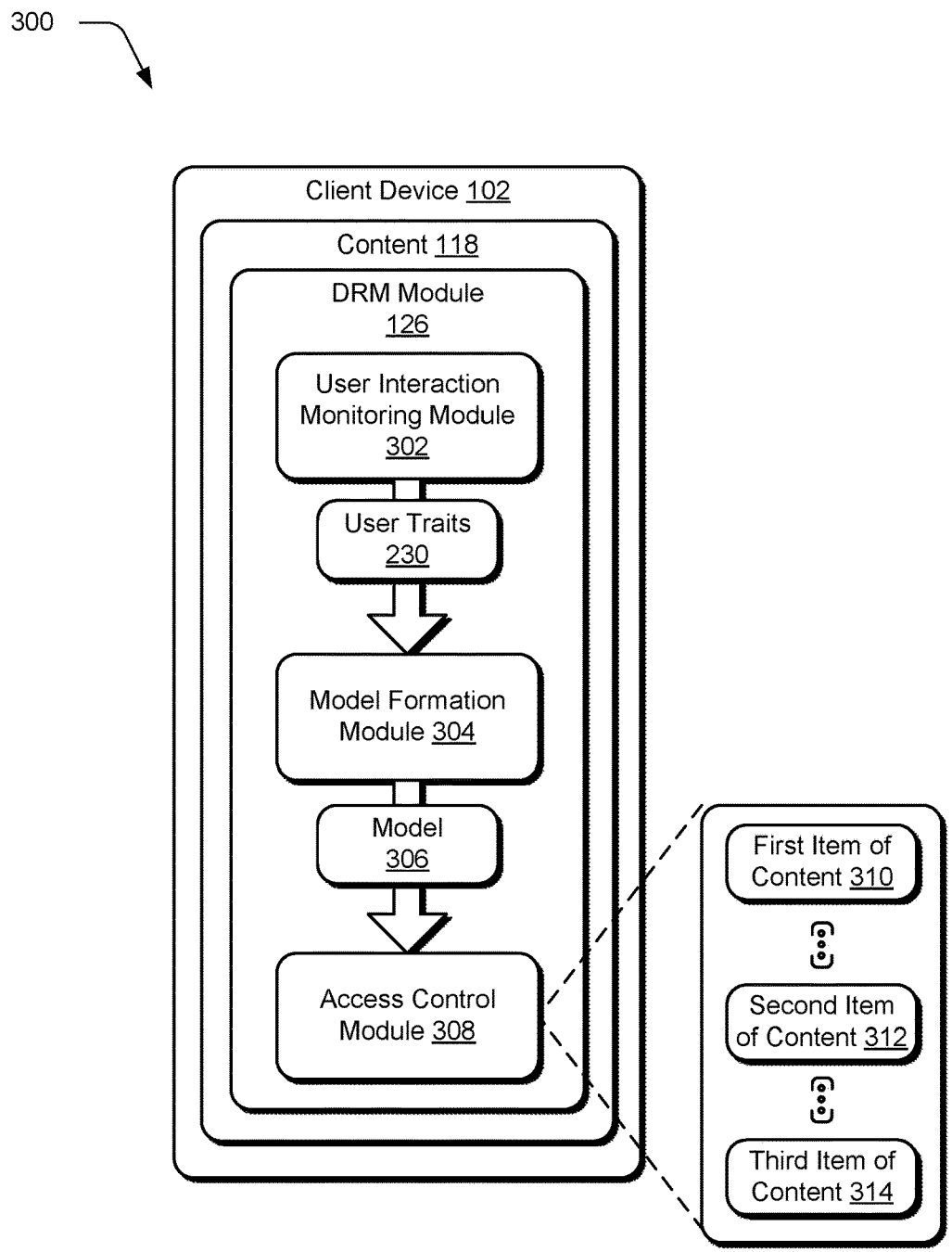
FIG. 3 depicts a system in an example implementation in which an embedded DRM module is used to monitor interaction to identify DRM traits and control access to items of content as traits are identified.

FIG. 3 depicts a system 300 in an example implementation in which an embedded DRM module 126 is used to monitor interaction to identify DRM traits and control access to items of content as traits are identified. The DRM module 126 includes a user interaction monitoring module 302 that is configured to monitor user interaction to identify user traits 230 as part of this interaction. The user traits 230, for instance, may describe traits learned through interaction with items of the content 118 itself. A user, for instance, may interact with an item of content and as part of that interaction, the user interaction monitoring module 302 may identify user traits 230, further discussion of which is described in relation to FIG. 4. In another instance, the user may interact with other items of content, the client device 102, other devices communicatively coupled to the client device 102, network services (e.g., a social network service), and so on. User traits 230 that describe these other interactions that are performed independently of the content 118 may also be identified by monitoring this interaction, an example of which is further described in relation to FIG. 5.

Regardless of a source of the user traits 230, a model formation module 304 is then employed, which is implemented at least partially in hardware, to form a model 306 of this interaction. The model 306 is then used by an access control module 308 to control access to items of content, e.g., first, second, and third items of content 310, 312, 314 based on which traits of the model 306 are met by traits of the DRM policy 116 implemented by the DRM module 126. An example of such control is described in the following of progressive control as additional user traits 230 of the model 306 are learned.

Figure 4:
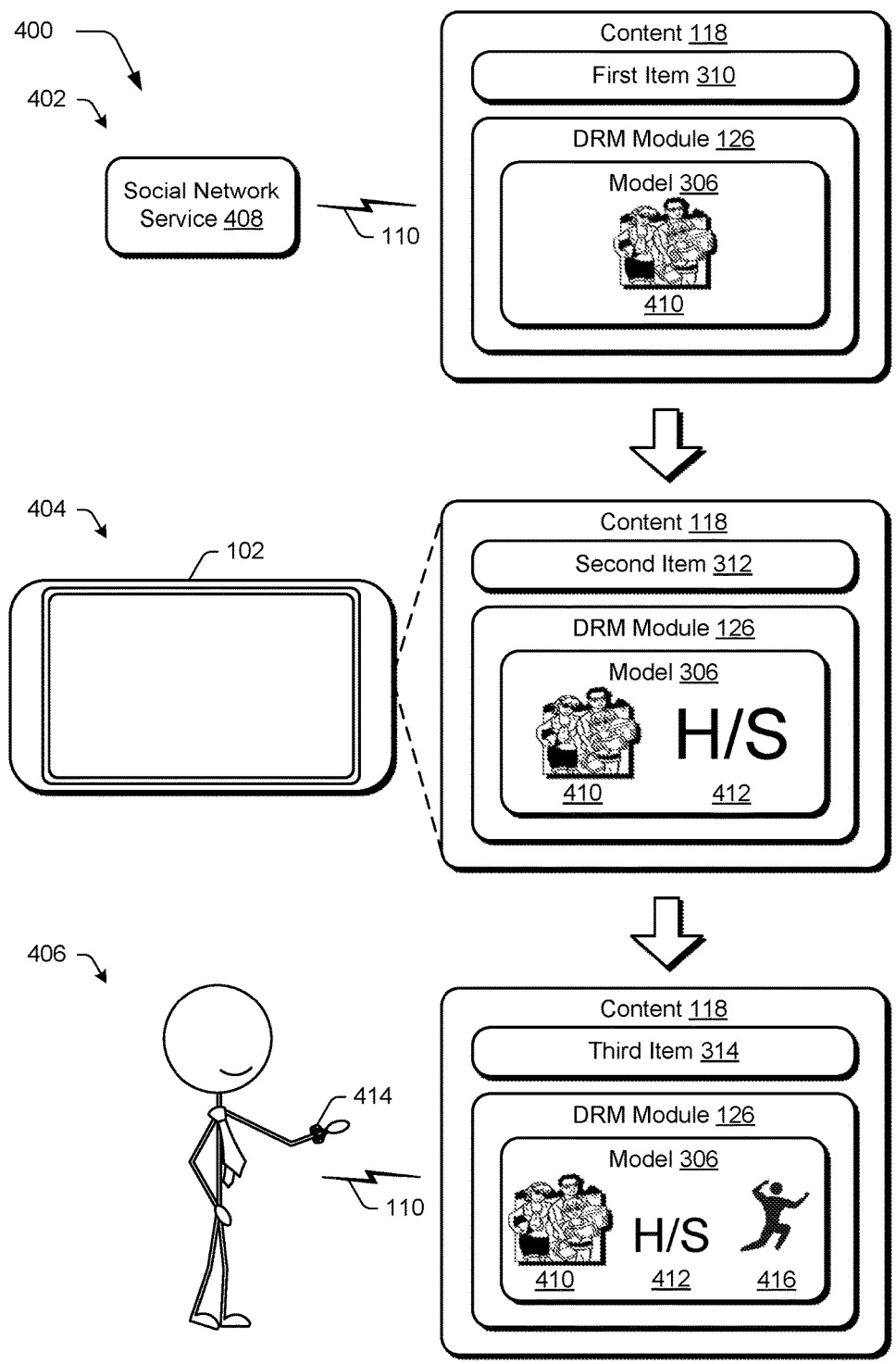
FIG. 4 depicts a system in an example implementation in which an embedded DRM module is used to progressively control access to items of content as traits are identified through interaction with the content.

FIG. 4 depicts a system 400 in an example implementation in which an embedded DRM module 126 is used to progressively control access to items of content 118 as traits are identified through interaction with the content 118. This system 400 is illustrated using first, second, and third stages 402, 404, 406. At the first stage 402, a user interacts with a first item 118 of the content 310. Part of that interaction includes access to a service provider over a network 110, an example of which is illustrated as a social network service 408.

The first item of the content 118, for instance, may provide an option to give a review of the content 118 for posting to the social network service 408. Accordingly, the DRM module 126 may gain access to the social network service 408 (which may be verified by the user) and identify social network traits 410 through this access, which are used to form the model 306. Examples of these social network traits 410 include age group 212, gender, and profile 218 of the user, friends of the user, and so forth. The user interaction monitoring module 302, for instance, may be configured to parse text made available from the service to identify the traits. This may be performed through calculation of a distribution and then distances of words in the distribution to corresponding traits.

At the second stage 404, the user continues interaction with a second item 312 of the content 118. Interaction with the second item 312 permits identification by the DRM module 126 of hardware and/or software traits 412 of the client device 102 that executes the DRM module 126. Examples of hardware and software traits 412 include whether the client device 102 includes touchscreen functionality, resolution of a display device, available storage, network connection resource availability, and so forth. The traits 412 are added as part of the model.

At the third stage 406, the user continues interaction with a third item 314 of the content 118. In this instance, the interaction involves communication with a wearable device 414 of the user that is accessible via a connection to a network 110, e.g., Bluetooth®. This interaction also permits identification of traits 416 from the wearable device 414. Examples of such traits include motion 226 (e.g., whether the user is moving, how much does the user move), biometric traits (e.g., heart rate, galvanic response) environmental 228 traits (e.g., UV light, temperature), and so forth. Thus, like the previous stages these traits 416 are further identified by the user interaction monitoring module 302 and used to update the model 306 by the model formation module 304 of the DRM module 126. In this way, the model 306 dynamically and progressively adapts and expands an understanding of the user's interaction with the content 118 through use of the model 306 and thus control based on this understanding may also adapt.

The model 306, for instance, may be used by the access control module 308 to guide the user in determining which items of the content 118 should be viewed next. In the previous stages, for instance, at the first stage 402 the traits 410 from the social network service 408 may be used to identify a friend of the user. In response, the DRM module 126 controls output of the second item 312 which includes an option to suggest the content 118 to the friend using text. However, at the third stage 406 the DRM module 126 determines that the user is moving above a threshold speed from the traits 416 obtained from the wearable device 414 and causes output of a third item 314 of the content as a notification that the option is not available while moving. Accordingly, the DRM module 126 may progress to learn traits 410, 412, 416 dynamically and adjust access to items of the content 118 based on this progression. In this example, interaction with the content 118 is used to learn the traits. Interaction with other sources independent of the content 118 may also be leveraged to form the model 306, an example of which is described in the following.

Figure 5:
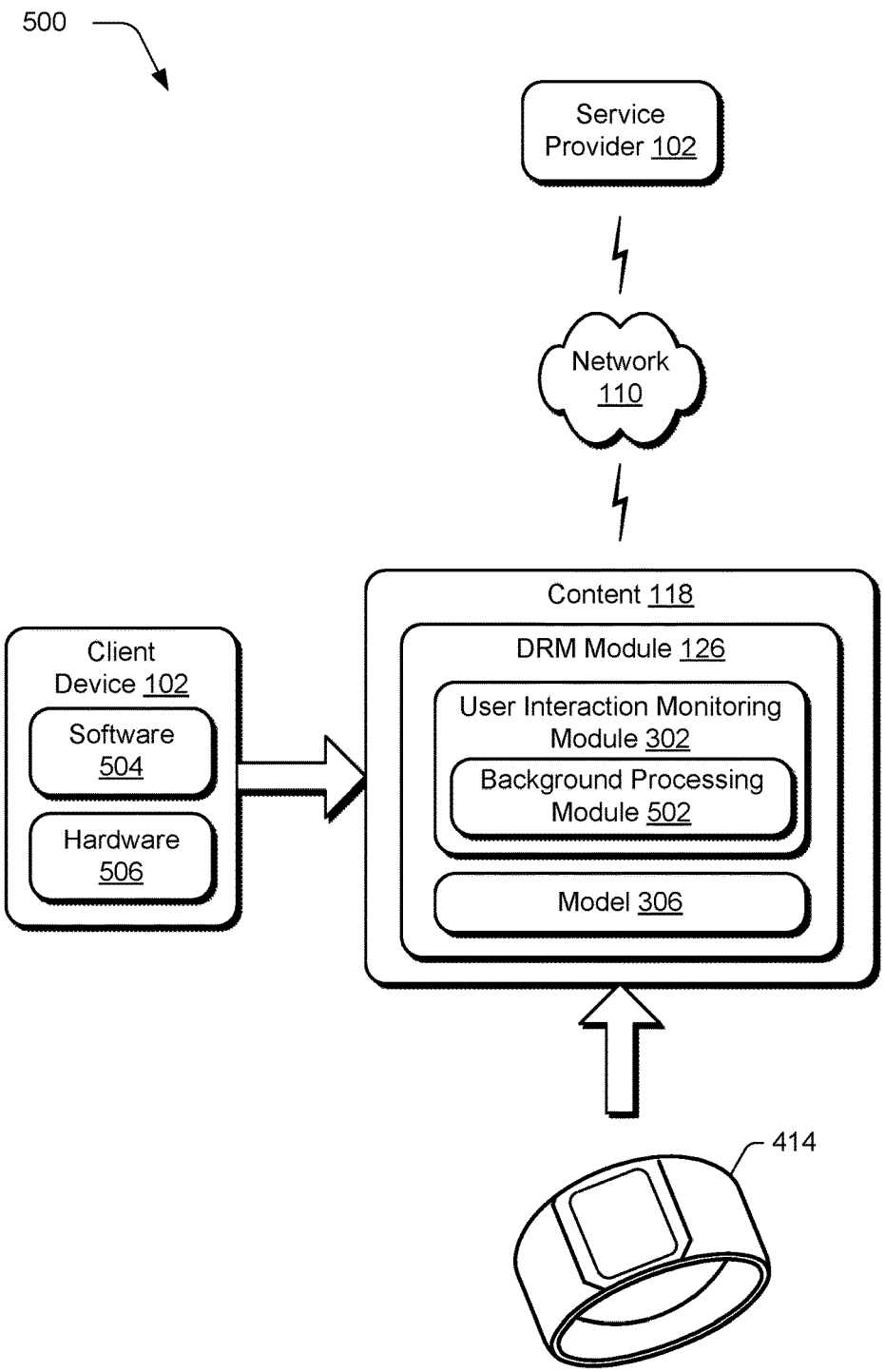
FIG. 5 depicts a system in an example implementation in which an embedded DRM module is used to progressively control access to items of content as traits are identified through interaction that is independent of the content.

FIG. 5 depicts a system 500 in an example implementation in which an embedded DRM module 126 is used to progressively control access to items of content 118 as traits are identified through interaction that is independent of the content 118. In this example, the user interaction monitoring module 302 includes a background processing module 502 that is implemented at least partially in hardware for background execution to monitor user interaction. When executed in the background, the background processing module 502 and indeed the entirety of the DRM module 126 is executed without rendering of a user interface or configured to accept user inputs. In this way, the execution of the background processing module 502 is configured to consume minimal resources yet still observe interaction of with other sources of traits independent of the content 118.

A user, for instance, may interact with a service provider 102 via a network enabled application. The background processing module 502 may observe this interaction and learn traits usable to control access to the content as part of the model 306. The traits, for instance, may originate from the service provider (e.g., friends in a social network service, job title in professional services network, and so on) or through communication via the network 110, e.g., IP address, network bandwidth, and so forth.

In another example the background processing module 502 is used to learn traits of a client device 102 that executes the module. This may include software 504 and hardware 506 resources of the device, including which other programs are available and interaction with those programs, processing and memory capabilities, display device functionality, input device availability (e.g., a touchscreen, voice control), and so on. This may also be used to determine which items of content 118 are made available to a user, e.g., different resolutions, support of different graphical user interfaces, and so forth.

In a further example, a peripheral device communicatively coupled to the client device 102 is used as a source of traits. A wearable device 414, for instance, such as a watch, pendant, glasses, and so forth may collect data regarding an environment of the device 414. This may include biometrics of a user wearing the device, an environment surrounding the user, and so forth. This may also be used to control access to items of content, such as to restrict access when the user is agitated as indicated by the biometrics. In this way, the model 306 may also be updated as different functionality is made available from different sources independent of the content 118, i.e., is not accessed through the content 118. A variety of other examples are also contemplated, further discussion of which is included in the following section.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
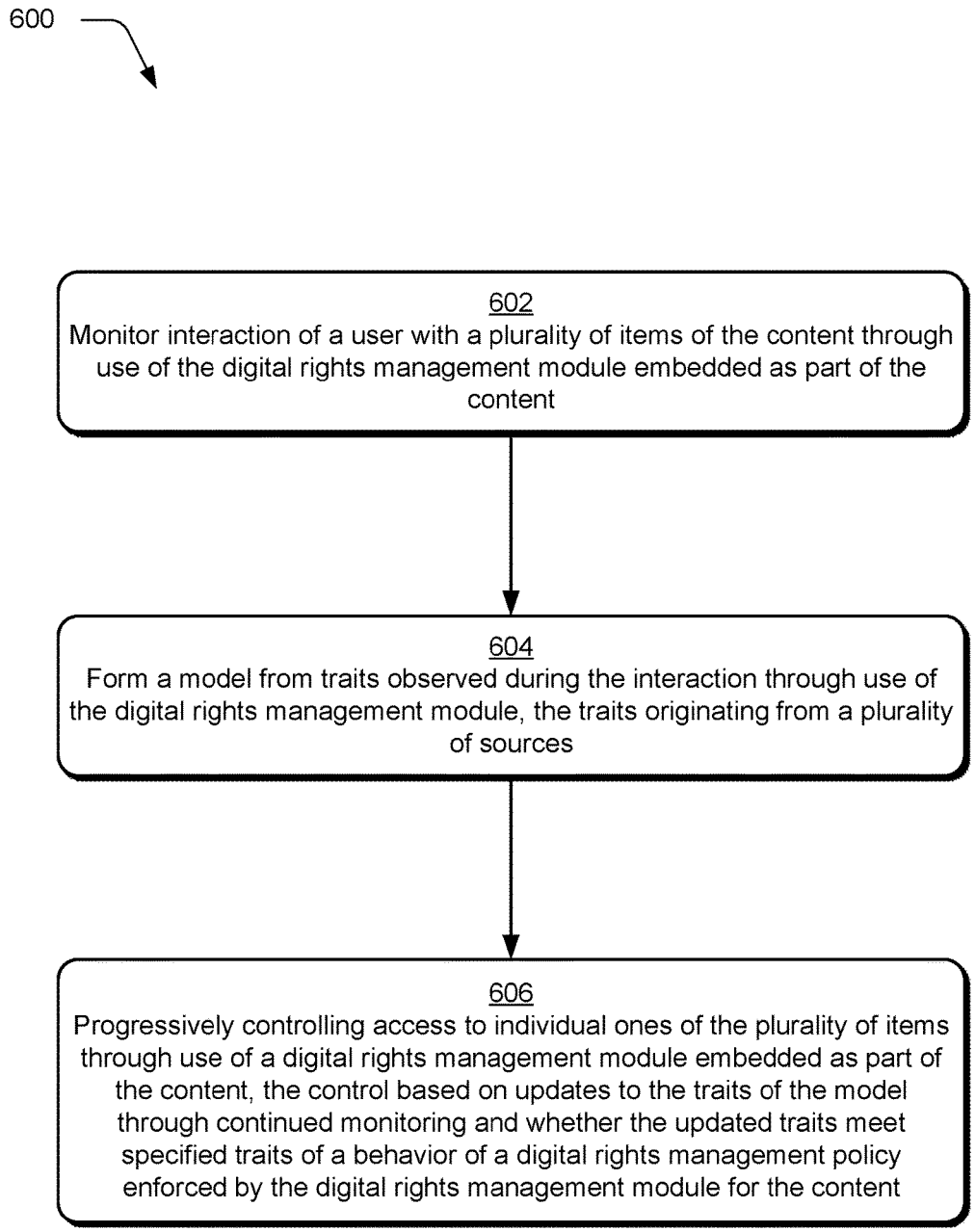
FIG. 6 is a flow diagram depicting a procedure in an example implementation in which progressive control of access to content is based on a model of traits observed during interaction with the content.

FIG. 6 depicts a procedure 600 in an example implementation in which progressive control of access to content is based on a model of traits observed during interaction with the content. Interaction is monitored of a user with a plurality of items of the content through use of the digital rights management module embedded as part of the content (block 602). The user, for instance, may interact over time with different items of the content 118. Through this interaction, a model is formed from traits observed during the interaction through use of the digital rights management module, the traits originating from a plurality of sources (block 604). This plurality of items, for instance, may be associated with different sources, such as a portion to purchase associated items from a service provider via a network 110, e.g., upsells as part of a game. This may also include sources such as wearable devices, the client device 102 itself, and so forth.

Access is progressively controlled to individual ones of the plurality of items through use of a digital rights management module embedded as part of the content. The controlling is based on updates to the traits of the model through continued monitoring and whether the updated traits meet specified traits of a behavior of a digital rights management policy enforced by the digital rights management module for the content (block 606). As the model 306 is updated with the traits observed through interaction with the content 118, these updates may be used to further refine access to items of the content 118 by the DRM module 126. In this way, the model 306 and control based on the model may continually adapt.

FIG. 7 depicts a procedure 700 in an example implementation in which progressive control of access to content is based on a model of traits observed during interaction independent of the content. Interaction is monitored of a user with the computing device through background execution of the embedded digital rights management module, the interaction performed independent of the content (block 702). The DRM module 126, may be executed in the background through use of the background processing module 502 to reduce resource consumption yet still monitor interaction that is performed independent of the content 118. Examples of this interaction include use of applications, content, hardware, and so forth that is not performed through access of the content 118 that includes the DRM module 126.

A model is formed from traits observed during the interaction through use of the digital rights management module (block 704). As before, these traits may describe the user, content accessed by the user, peripheral devices communicatively coupled to the client device 102 such as a wearable device, the client device 102 itself that executes the DRM module 126, service providers access via the network 110, and so forth.

Access is controlled to the at least one item of content through use of a digital rights management module embedded as part of the content. The control is based on whether the traits of the model of the user meet specified traits of a behavior of a digital rights management policy enforced by the digital rights management module for the content (block 706). This may include guiding the user to particular items of the content through recommendations, restriction/access to content, and so forth as described above.

Example System and Device

Figure 8:
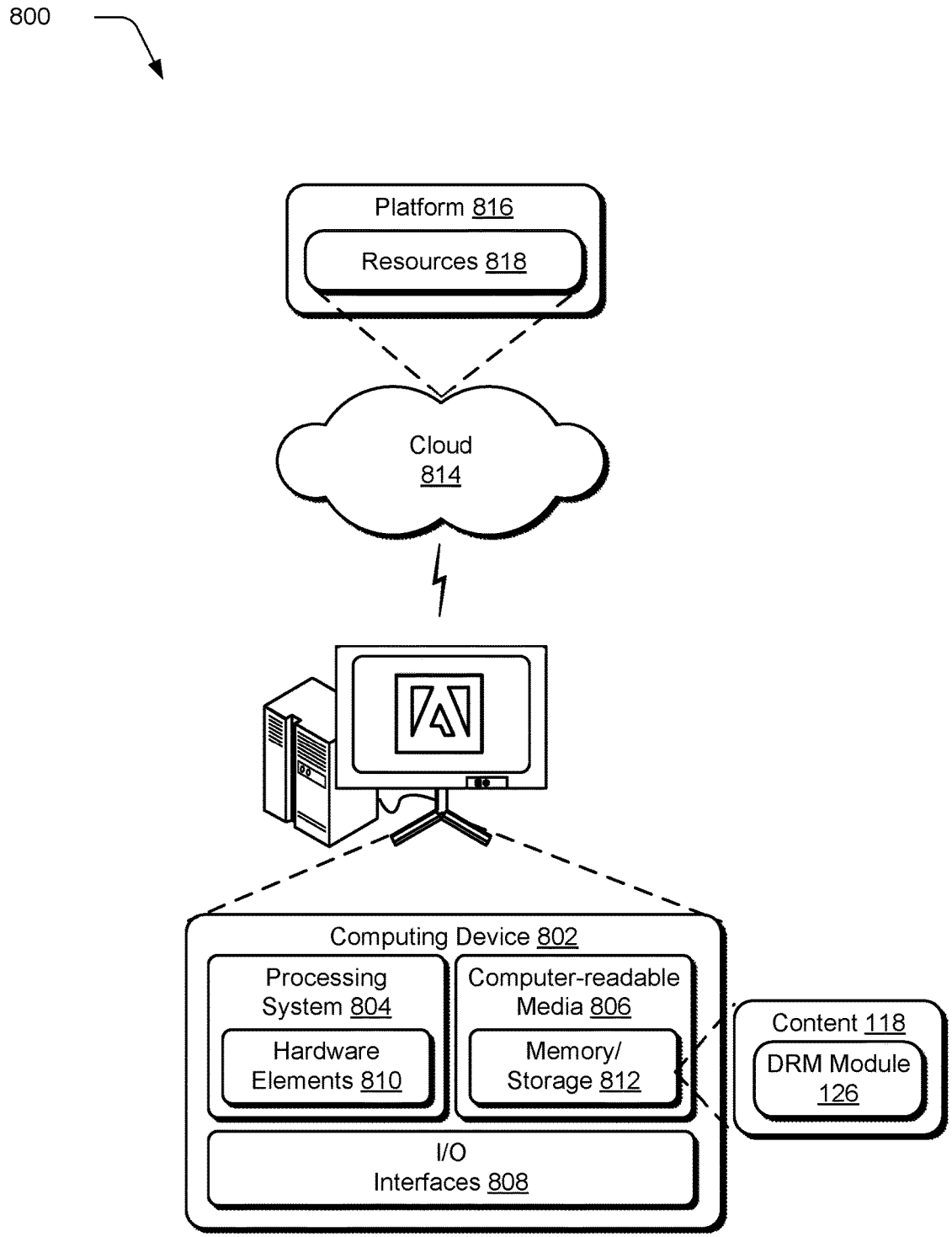
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the content 118 and DRM module 126. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware.

Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by a client computing device, the method comprising:
   downloading, by the client computing device, content that includes a plurality of items and a digital rights management module embedded as part of the content;
   monitoring, by the client computing device, user interaction with other content that is executable on the client computing device independent of the content, the monitoring performed via background processing of the digital rights management module such that the embedded digital rights management module is not directly accessible to a user of the client computing device;
   forming, by the client computing device, a model, as a function of progressively learned traits observed during the interaction with the other content through use of the digital rights management module; and
   progressively controlling access, by the client computing device, to individual ones of the plurality of items of the content through use of a digital rights management module embedded as part of the content, the controlling based on updates to the progressively learned traits of the model through continued said monitoring of the user interaction with the other content and whether the progressively learned traits meet specified traits of a behavior of a digital rights management policy enforced by the digital rights management module for the content.

2. The method as described in claim 1, wherein the monitoring includes monitoring user interaction with another source that is a wearable device that is communicatively coupled to the client computing device.

3. The method as described in claim 2, wherein the wearable device is configured to communicate biometric traits, motion traits, or geographical traits.

4. The method as described in claim 1, wherein the monitoring includes monitoring user interaction with another source that is accessible via a network.

5. The method as described in claim 4, wherein the another source is a social network service.

6. The method as described in claim 5, further comprising parsing text obtained from the social network service through execution of the embedded digital rights management module and identifying at least one said progressively learned trait based on the parsing.

7. The method as described in claim 1, wherein at least one said progressively learned trait describes hardware or software functionality of the computing device used to execute the other content.

8. The method as described in claim 1, further comprising updating the model at subsequent points in time based on one or more progressively learned traits observed through subsequent said monitoring.

9. In a digital medium environment, a method implemented by a client computing device, the method comprising:
   downloading, by the client computing device, content that includes a plurality of items and a digital rights management module embedded as part of the content;
   monitoring, by the client computing device, user interaction with an application executed by the computing device through background execution of the embedded digital rights management module such that the embedded digital rights management module is not directly accessible to a user of the client computing device, the user interaction performed independent of the content and the execution of the application performed independent of the content;
   forming, by the client computing device, a model from traits observed during the user interaction through use of the digital rights management module; and
   controlling access to individual items of the plurality of item of the content, by the client computing device, through use of the digital rights management module, the controlling based on whether the traits of the model meet specified traits of a behavior of a digital rights management policy enforced by the digital rights management module for the content.

10. The method as described in claim 9, wherein the background execution is performed such that the embedded digital rights management module does not render a user interface for display by the client computing device.

11. The method as described in claim 9, wherein the direct accessibility includes use of a keyboard, touchscreen functionality, or cursor control device to provide inputs by the user.

12. The method as described in claim 9, further comprising detecting the interacting using a wearable device.

13. The method as described in claim 12, wherein the wearable device is configured to communicate biometric traits, motion traits, or geographical traits.

14. The method as described in claim 9, further comprising detecting user interaction with at least one source that is accessible via a network and at least one of the progressively learned traits is based on the detecting.

15. The method as described in claim 14, wherein the at least said source is a social network service.

16. In a digital medium environment to control access to content, a system comprising:

a processing system; and a computer-readable storage medium having instructions stored thereon that, responsive to execution by the processing system, causes the processing system to perform operations comprising:

receiving content that includes a plurality of items and a digital rights management module embedded as part of the content;

monitoring user interaction with a service provider via a network through background processing of the digital rights management module such that the embedded digital rights management module is not directly accessible to a user;

forming a model as a function of progressively learned traits observed during the user interaction with the service provider through use of the digital rights management module; and progressively controlling access to individual ones of the plurality of items of the content through use of the digital rights management module embedded as part of the content, the controlling based on updates to the progressively learned traits of the model through continued said monitoring of the user interaction with the service provider and whether the progressively learned traits meet specified traits of a behavior of a digital rights management policy enforced by the digital rights management module for the content.

17. The system as described in claim 16, wherein the service provider is a social network system.

18. The system as described in claim 16, wherein at least one source involved in the user interaction includes a wearable device that is configured to communicate biometric traits, motion traits, or geographical traits.

19. The system as described in claim 16, wherein at least source involved in the user interaction describes hardware or software functionality used to execute the content.

20. The system as described in claim 16, wherein the direct accessibility includes use of a keyboard, touchscreen functionality, or cursor control device to provide inputs by the user.

* * * * *